(12) United States Patent
Khalid

(10) Patent No.: US 12,439,361 B2
(45) Date of Patent: Oct. 7, 2025

(54) AUTOMATED RELAY REGISTRATION IN A CITIZENS BROADBAND RADIO SERVICE (CBRS) SYSTEM

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 317 days.

(21) Appl. No.: 18/348,005

(22) Filed: Jul. 6, 2023

(65) Prior Publication Data

US 2025/0016713 A1    Jan. 9, 2025

(51) Int. Cl.
*H04W 60/04*    (2009.01)

(52) U.S. Cl.
CPC .................................. *H04W 60/04* (2013.01)

(58) Field of Classification Search
CPC ..................................................... H04W 60/04
See application file for complete search history.

(56) References Cited

U.S. PATENT DOCUMENTS

| | | | |
|---|---|---|---|
| 10,327,150 B2 | 6/2019 | Markwart et al. | |
| 11,026,205 B2 | 6/2021 | Hmimy et al. | |
| 12,232,190 B2 * | 2/2025 | Khalid | H04W 72/0453 |
| 12,360,366 B2 * | 7/2025 | Dehkordi | G02B 27/0149 |
| 12,362,965 B2 * | 7/2025 | Yamamoto | H04L 12/46 |
| 12,363,553 B2 * | 7/2025 | Ergen | H04W 16/18 |
| 2021/0143893 A1 | 5/2021 | Taneja et al. | |
| 2022/0038196 A1 * | 2/2022 | Syed | H04W 16/225 |
| 2023/0116761 A1 * | 4/2023 | Barry | H04M 15/51 |
| | | | 370/329 |

* cited by examiner

*Primary Examiner* — Faruk Hamza
(74) *Attorney, Agent, or Firm* — Young Basile Hanlon & MacFarlane, P.C.

(57) ABSTRACT

Methods and systems for automated relay registration in a customer premises is described herein. A method for automatically registering a relay using a Citizens Broadband Radio Service (CBRS) spectrum includes receiving, at a spectrum access system (SAS) registration processing tool from a user interface input unit, relay information for a relay to extend wireless coverage in a customer premises, the wireless coverage extending from a donor base station, extracting, by the SAS registration processing tool, commonly-used object information from a donor base station object associated with the donor base station, generating, by the SAS registration processing tool, a relay registration object from the relay information and the extracted commonly-used object information, and automatically registering, by the SAS registration processing tool, the relay with a spectrum access system using the relay registration object when the relay is turned on at the customer premises.

20 Claims, 14 Drawing Sheets

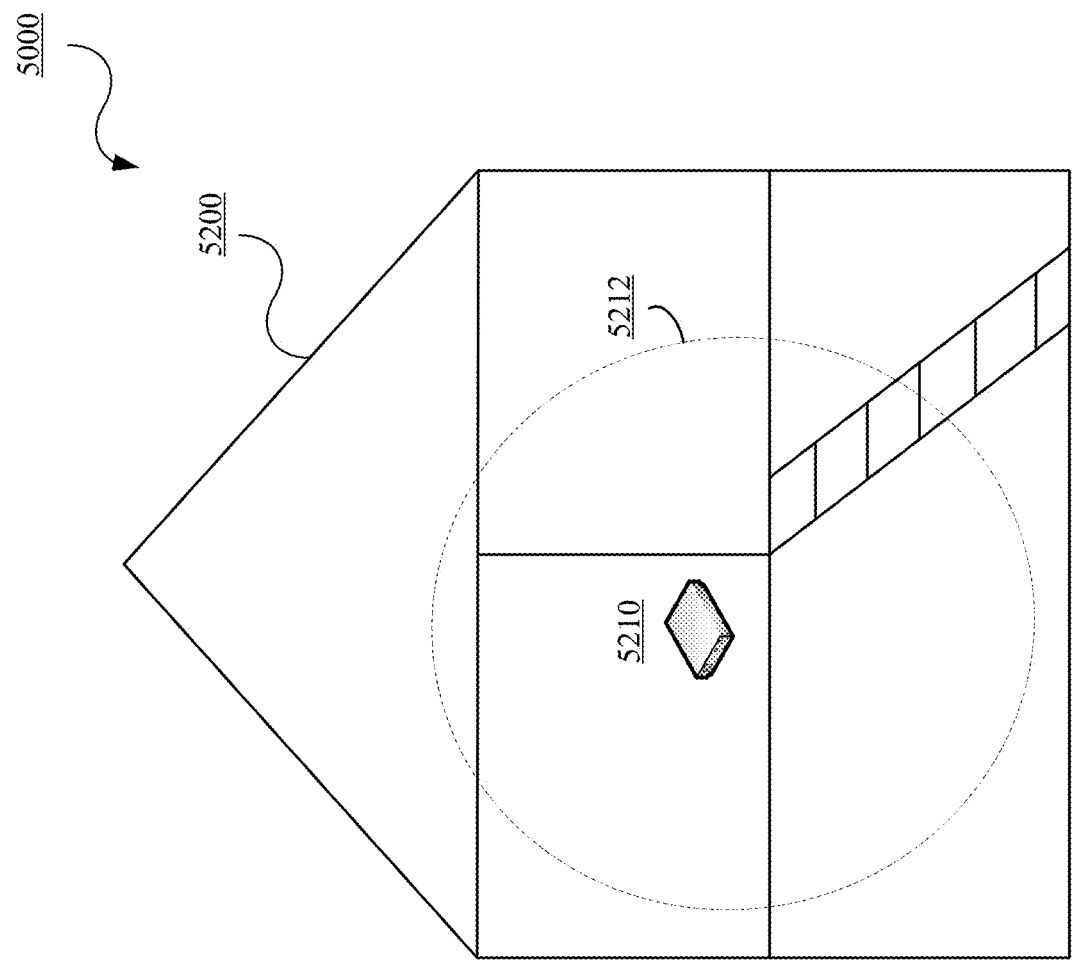
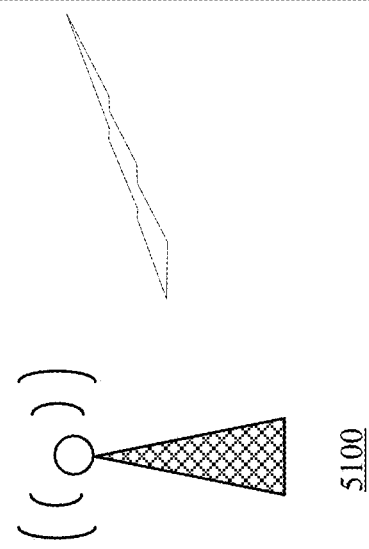
FIG. 5

- *RegistrationRequest* message object
  - {"userId", "fccId", "callSign", "cbsdSerialNumber", "cbsdCategory", "airInterface", "measCapability", "groupingParam", "eirpCapability", "horizontalAccuracy", "verticalAccuracy", "latitude", "longitude", "height", "heightType", "indoorDeployment", "antennaAzimuth", "antennaDowntilt", "antennaGain", "antennaBeamwidth", "antennaModel", "vendor", "cbsdModel", "softwareVersion", "hardwareVersion", "firmwareVersion"}

FIG. 11A

|     | userId* | fccId* | callSign | cbsdSerialNumber* | cbsdCategory* | airInterface* | measCapability* |
|-----|---------|--------|----------|-------------------|---------------|---------------|-----------------|
| (1) |         |        |          |                   |               |               |                 |
| (2) | groupingParam |  |          |                   |               |               |                 |
| (3) | cbsdSerialNumber* | airCapability | horizontalAccuracy | verticalAccuracy | latitude* | longitude* | antennaModel |
| (4) | height* | heightType* | indoorDeployment* | antennaAzimuth* | antennaDownlilt* | antennaGain* | antennaBeamwidth* |

\* = *Mandatory parameters for CBSD registration with the SAS, CBSD registration will be unsuccessful if any are missing*

| SECOND ROW | Parameters in this row will be sent to the SAS by the CBSD/Domain Proxy. When CBSD is configured in its EMS then Airspan Domain Proxy will send these parameters as part of CBSD registration request to the SAS. |
|---|---|

| THIRD AND FOURTH ROWS | Parameters in these rows will be signed off and submitted to the SAS by the CPI using CPI tool or SAS provided UI tool. Latitude, longitude, height and antennaAzimuth parameters will vary site by site. All other installation parameters will remain same for each small cell type and will be auto populated (when CPI tool is used) while selecting predefined template for a specific small cell type. |
|---|---|

FIG. 11B

AUTOMATED RELAY REGISTRATION IN A CITIZENS BROADBAND RADIO SERVICE (CBRS) SYSTEM

TECHNICAL FIELD

This disclosure relates to wireless communications. More specifically, automatic registration of relays with a spectrum access system where the relays are used to extend wireless coverage provided at a customer premises.

BACKGROUND

Wireless telecommunications or radio access technologies (RATs) generally use licensed radio frequency spectrum for communications between mobile devices and wireless telecommunications networks. For example, licensed spectrum is used for third generation (3G), fourth generation (4G), and fifth generation (5G) wireless communications. Wireless telecommunications technologies may also use unlicensed spectrum.

Citizens Broadband Radio Service (CBRS) spectrum is a type of unlicensed spectrum or shared radio frequency spectrum which is shared between multiple entities including government users (such as the military), licensed users, and non-licensed users. CBRS is a multitiered wireless band between 3.550 MHz and 3.700 MHz. In particular, CBRS is a three-tiered access framework including incumbent users (i.e., federal, military, and the like), priority access users (winning auction bidders), and general authorized access users, where the general users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using a centralized spectrum access system (SAS), which may be a federal or commercial entity. The SAS authorizes or grants spectrum to access points known as CBRS Devices (CBSDs) and performs interference management to protect higher tier users. This protection may include, for example, dropping CBSDs which are general authorized access users. In summary, CBRS is an interference limited network which means that the performance of the network and the data sent to CBRS subscribers is limited by the amount of interference the CBRS users or subscribers experience in the frequency band of operation.

Relay nodes, relays, and/or extender devices (collectively referred to herein as a "relay") are used to extend coverage, complement coverage, and capacity of a wireless network. A relay receives a wireless transmission or signal from a donor base station, processes the signal, and retransmits the signal. The processing of the signal can include, but is not limited to, signal correction, signal quality, and signal amplification (i.e., increased power level). Each relay has to be registered with the SAS when the relay is used with the CBRS spectrum. This can include one or more truck rolls with a certified professional installer to a customer premises to determine coverage issues, obtain relays, install relays, and register the relays with the SAS. This can be cumbersome and inefficient as the number of relays increase to provide wireless coverage.

SUMMARY

Disclosed herein is a method for automated relay registration in a customer premises. In implementations, a method for automatically registering a relay using a Citizens Broadband Radio Service (CBRS) spectrum includes receiving, at a spectrum access system (SAS) registration processing tool from a user interface input unit, relay information for a relay to extend wireless coverage in a customer premises, the wireless coverage extending from a donor base station, extracting, by the SAS registration processing tool, commonly-used object information from a donor base station object associated with the donor base station, generating, by the SAS registration processing tool, a relay registration object from the relay information and the extracted commonly-used object information, and automatically registering, by the SAS registration processing tool, the relay with a spectrum access system using the relay registration object when the relay is turned on at the customer premises.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 5 is a diagram of an example of a wireless network architecture in accordance with embodiments of this disclosure.

FIG. 11A is a diagram of an object in accordance with embodiments of this disclosure.

FIG. 11B is a diagram of object fields in accordance with embodiments of this disclosure.

DETAILED DESCRIPTION

Figure 1:
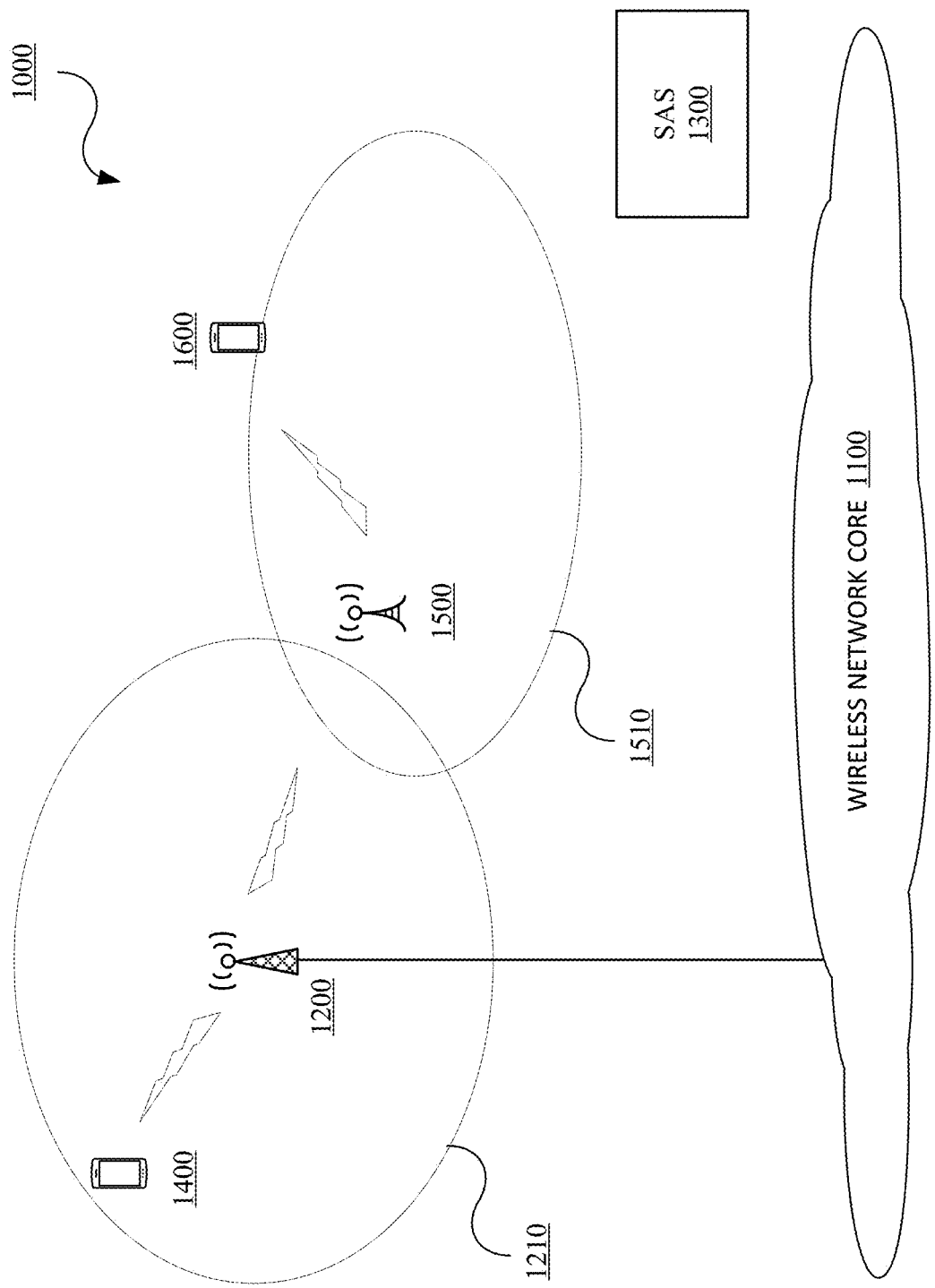
FIG. 1 is a diagram of an example of a wireless network architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of an example wireless network architecture 1000. The wireless network architecture 1000 can include, but is not limited to, a core 1100, one or more base stations 1200, and a spectrum access system (SAS) 1300. Each base station 1200 can provide a wireless coverage 1210 for use by a mobile device 1400. The wireless network architecture 1000 can include one or more relays 1500 which in communication with one or more the one or more base stations 1200. Each relay 1500 can have a corresponding wireless coverage 1510. The number of components shown herein are illustrative and there may be more or less in the wireless network architecture 1000. The wireless network architecture 1000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The wireless network architecture 1000 can implement any wireless technology including, but not limited to, third generation (3G), fourth generation (4G), and fifth generation (5G) wireless communications, and CBRS or shared spectrum wireless technologies.

The core 1100 can include various functional components to address mobility management, authentication, session management, and other related functions.

The base station 1200 can be an access point, an access node, or like device which enables radio communications access between mobile devices and other devices. In the instance that the base station 1200 uses or supports the CBRS spectrum, the base station can be, in part, a CBRS Device (CBSD), which has been granted or authorized CBRS spectrum by the SAS 1300. The base station 1200 can be part of a service provider system or multiple systems operator (MSO) which provides connectivity and content to the mobile device 1400 and the mobile device 1600, for example. In implementations, the base station 1200 can be operated via or under a mobile virtual network operator (MVNO) which provides connectivity and content to the mobile device 1400 and the mobile device 1600, for example. The base station 1200 can be denoted as a donor base station when supporting a relay.

The mobile device 1400 and the mobile device 1600 can be, but is not limited to, Internet of Thing (IoT) devices, sensors, end user devices, cellular telephones, Internet Protocol (IP) devices, mobile computers, laptops, handheld computers, personal media devices, smartphones, notebooks, notepads, and the like can be provisioned for operation with a MSO, a MVNO, or other like service provider.

The SAS 1300 enables access to the CBRS spectrum and dynamically manages the spectrum for optimal use, efficiency, and compliance with CBRS rules. The SAS 1300 communicates with each base station 1200 (which can be a CBSD) for registration, grant allocation/deallocation and interference management. The SAS 1300 can perform interference analysis based on the power measurements received from mobile device(s) and make allocation and deallocation decisions based on the interference. The SAS 1300 may be operated be a commercial, federal entity, or some combination thereof.

The relay 1500 can be setup at a cell edge to help a distant mobile device 1600 get back to the base station 1200. The relay 1500 can increase or augment the wireless coverage and/or increase a capacity of the wireless network architecture 1000. In the instance that relay 1500 supports or uses the CBRS spectrum, the relay 1500 needs to be registered with the SAS 1300. In implementations, the relay 1500 can be registered with the SAS 1300 using the systems and methods described herein.

As mentioned, relays complement coverage and capacity of a wireless network. Relays can be used with in outdoor and indoor environments.

Figure 2:
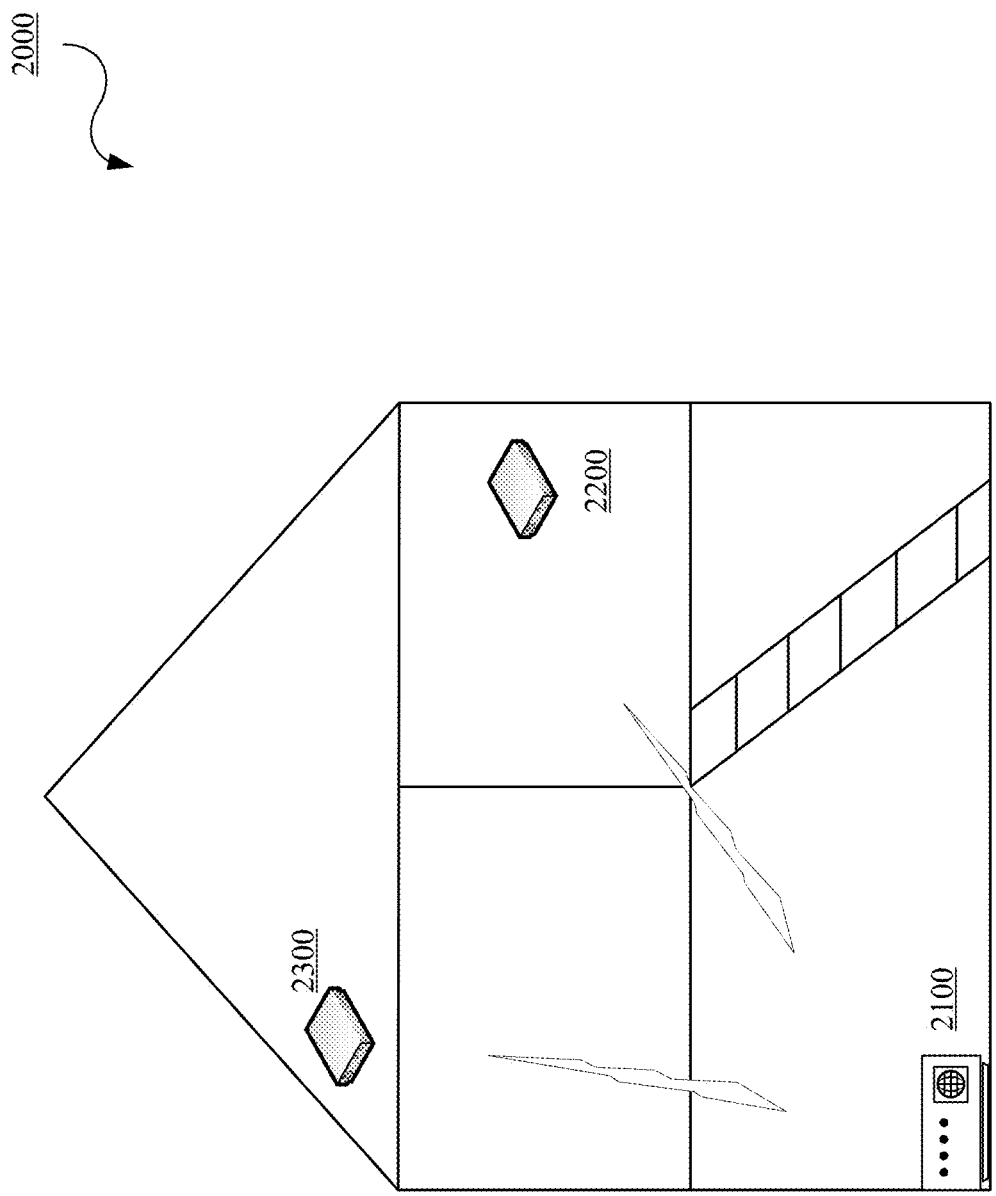
FIG. 2 is a diagram of an example of a customer premises with relays in accordance with embodiments of this disclosure.

FIG. 2 is a diagram of an example of a customer premises 2000 with relays in accordance with embodiments of this disclosure. The customer premises 2000 can include an indoor base station 2100, a relay 2200, and a relay 2300. The indoor base station 2100 can be an access point, an access node, or like device which enables radio communications access between mobile devices, customer premises equipment, and other devices. The indoor base station 2100 is a wired device (i.e., backhaul device) that provides a defined coverage range. The relays 2200 and 2300 can be wirelessly connected to the indoor base station 2100 (which acts as an indoor donor base station) to provide wireless coverage in areas of the customer premises that are not covered or sufficiently covered by the indoor base station 2100. The indoor base station 2100 and the relays 2200 and 2300 each support or use the CBRS spectrum. The indoor base station 2100 can be authorized or granted use of the CBRS spectrum by a SAS. In implementations, each of the relays 2200 and 2300 can be registered with a SAS using the systems and methods described herein.

Figure 3:
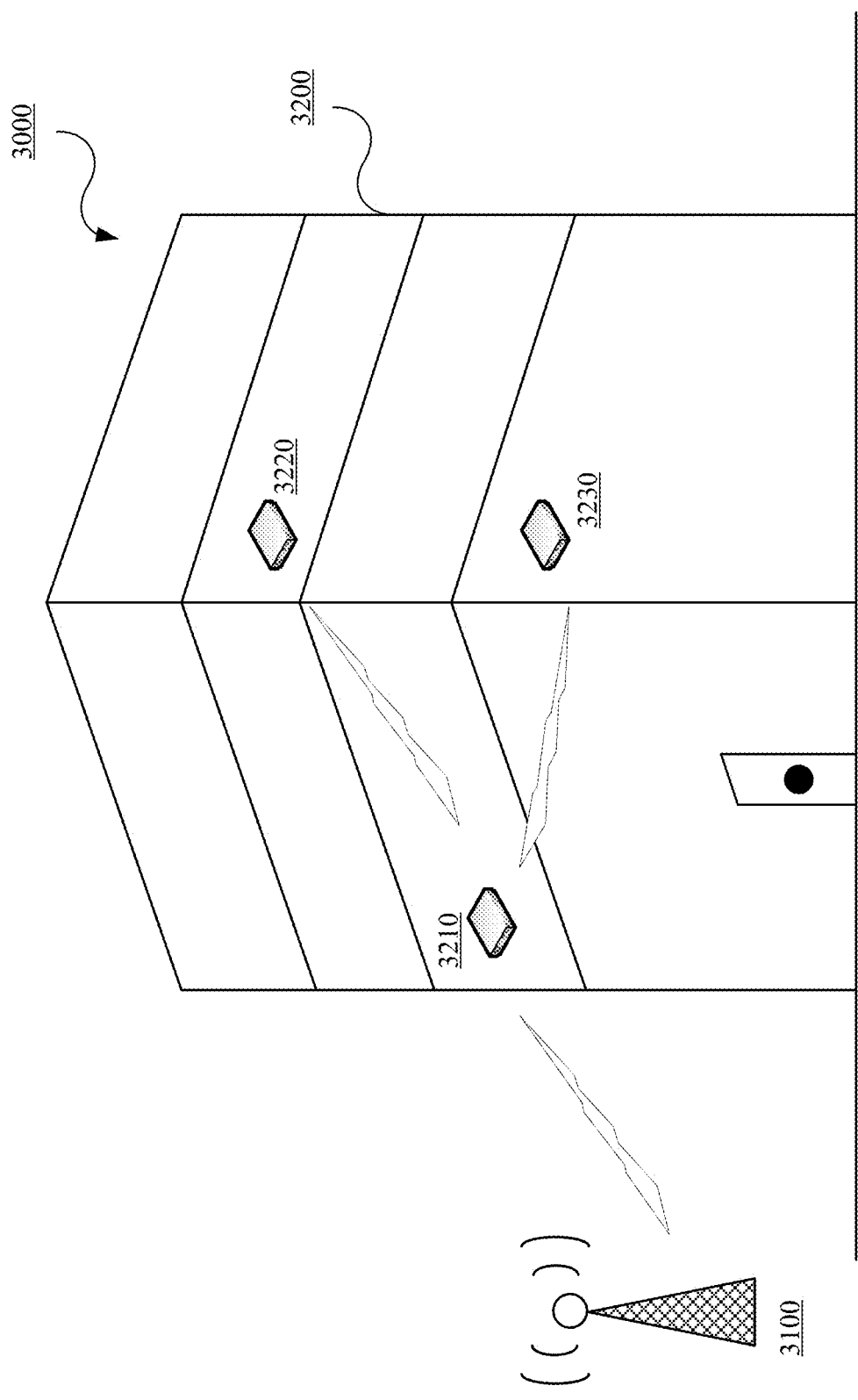
FIG. 3 is a diagram of an example of a wireless network architecture in accordance with embodiments of this disclosure.

FIG. 3 is a diagram of an example of a wireless network architecture 3000 in accordance with embodiments of this disclosure. The wireless network architecture 3000 can include a base station 3100 and a customer premises 3200. The base station 3100 is a backhaul device and acts as an outdoor donor base station to relays 3210, 3220, and 3230, which collectively extend coverage of the base station 3100 inside the customer premises 3200. The base station 3100 can be an access point, an access node, or like device which enables radio communications access between mobile devices, customer premises equipment, and other devices. The relays 3210, 3220, and 3230 can extend coverage in one or more wireless hops. The base station 3100 and the relays 3210, 3220, and 3230 each support or use the CBRS spectrum. The base station 3100 can be authorized or granted use of the CBRS spectrum by a SAS. In implementations, each of the relays 3210, 3220, and 3230 can be registered with a SAS using the systems and methods described herein.

Figure 4:
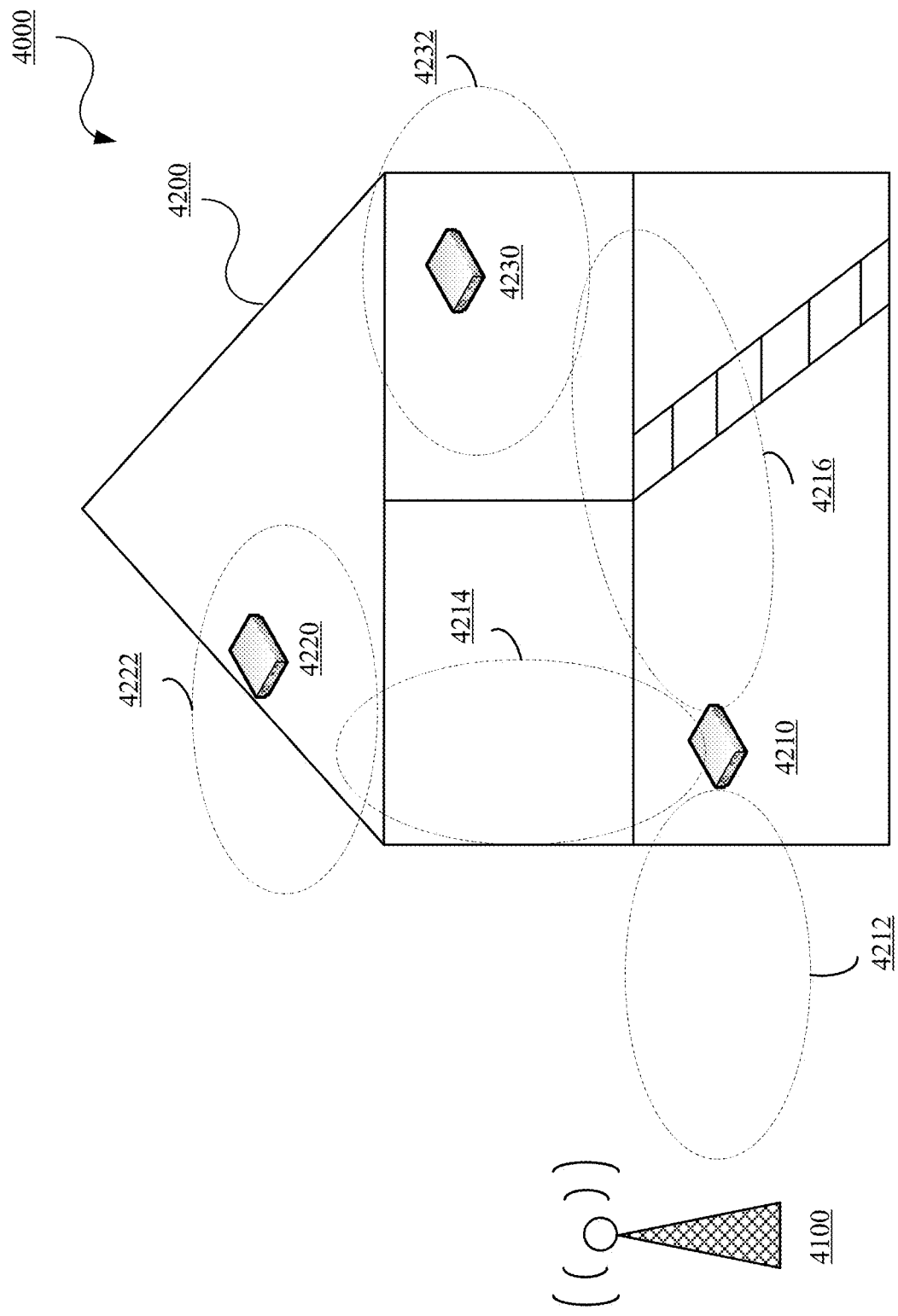
FIG. 4 is a diagram of an example of a wireless network architecture in accordance with embodiments of this disclosure.

FIG. 4 is a diagram of an example of a wireless network architecture 4000 in accordance with embodiments of this disclosure. The wireless network architecture 4000 can include a base station 4100 and a customer premises 4200. The base station 4100 is a backhaul device and acts as an outdoor donor base station to relays 4210, 4220, and 4230, which collectively extend coverage of the base station 4100 inside the customer premises 4200. The base station 4100 can be an access point, an access node, or like device which enables radio communications access between mobile devices, customer premises equipment, and other devices. In this instance, the relay 4210 can be a multi-sector relay which includes sectors 4212, 4214, and 4216, the relay 4220 can be a single sector relay which includes sector 4222, and the relay 4230 can be a single sector relay which includes sector 4232. In implementations, each of the relays 4210, 4220, and 4230 can extend coverage in one or more wireless hops. The base station 4100 and the relays 4210, 4220, and 4230 each support or use the CBRS spectrum. The base station 4100 can be authorized or granted use of the CBRS spectrum by a SAS. In implementations, each of the relays 4210, 4220, and 4230 can be registered with the SAS using the systems and methods described herein. In the case of the relay 4210, each of the sectors 4212, 4214, and 4216 is individually and separately registered with the SAS using the systems and methods described herein.

FIG. 5 is a diagram of an example of a wireless network architecture 5000 in accordance with embodiments of this disclosure. The wireless network architecture 5000 can include a base station 5100 and a customer premises 5200. The base station 5100 is a backhaul device and acts as an outdoor donor base station to relay 5210, which can extend coverage of the base station 5100 inside the customer premises 5200. The base station 5100 can be an access point, an access node, or like device which enables radio communications access between mobile devices, customer premises equipment, and other devices. In this instance, the relay 5210 can be a single sector relay which includes sector 5212. The base station 5100 and the relay 5210 can support or use the CBRS spectrum. The base station 5100 can be authorized or granted use of the CBRS spectrum by a SAS. In implementations, the relay 5210 can be registered with the SAS using the systems and methods described herein.

Figure 6:
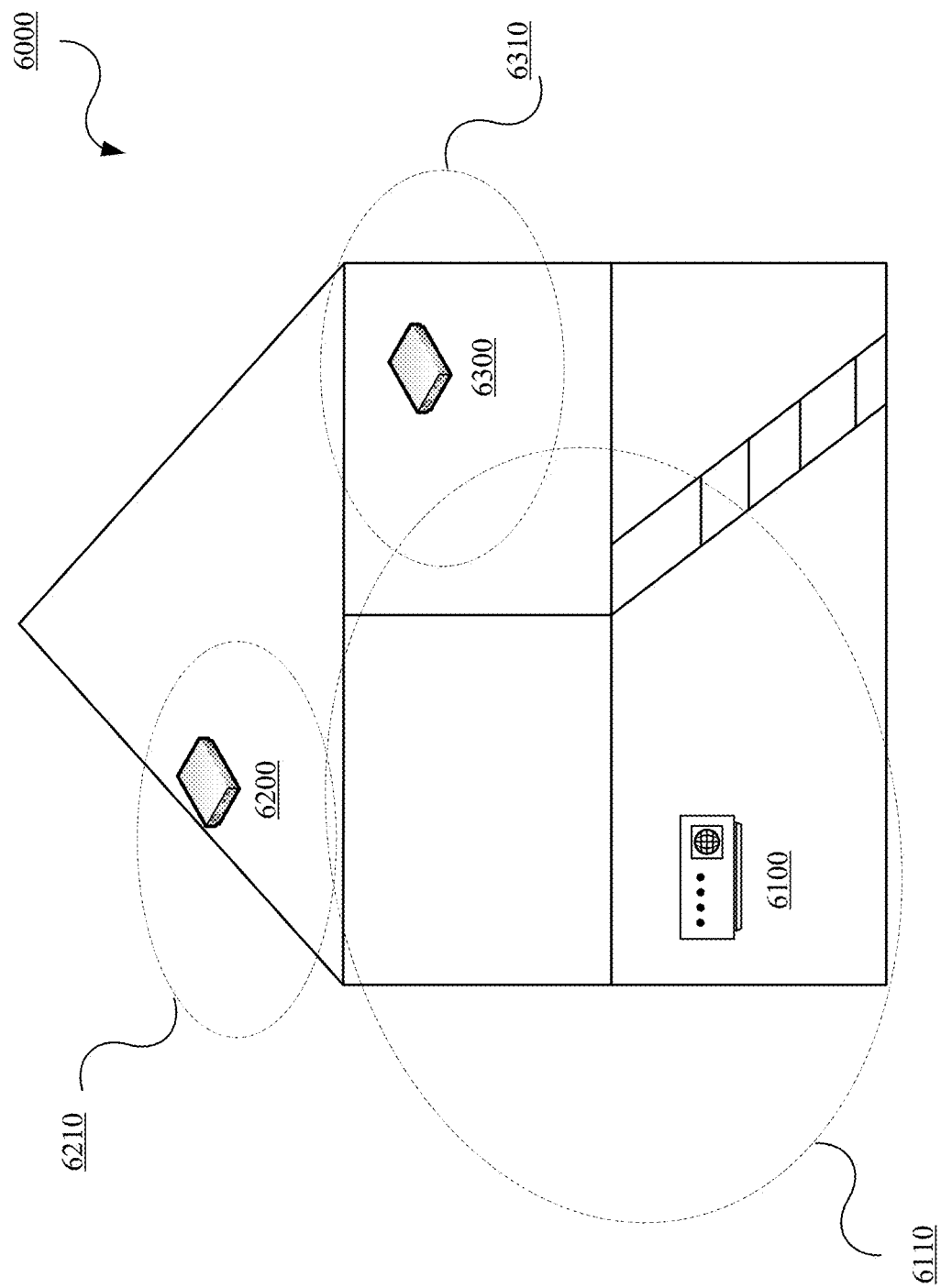
FIG. 6 is a diagram of an example of a customer premises with relays in accordance with embodiments of this disclosure.

FIG. 6 is a diagram of an example of a customer premises 6000 in accordance with embodiments of this disclosure. The customer premises 6000 can include an indoor base station 6100, a relay 6200, and a relay 6300. The indoor base station 6100 can be an access point, an access node, or like device which enables radio communications access between mobile devices, customer premises equipment, and other devices. The indoor base station 6100 is a wired device (i.e., backhaul device) that provides a defined coverage range or has a single sector 6110. The relays 6200 and 6300 can be wirelessly connected to the indoor base station 6100 (which acts as an indoor donor base station) to provide wireless coverage in areas of the customer premises 6000 that are not covered or sufficiently covered by the indoor base station 6100. In this instance, the relay 6200 can be a single sector relay which includes a sector 6210, and the relay 6300 can be a single sector relay which includes a sector 6310. The base station 6100 and the relays 6200 and 6300 each support or use the CBRS spectrum. The base station 6100 can be authorized or granted use of the CBRS spectrum by a SAS. In implementations, each of the relays 6200 and 6300 can be registered with the SAS using the systems and methods described herein.

Figure 7:
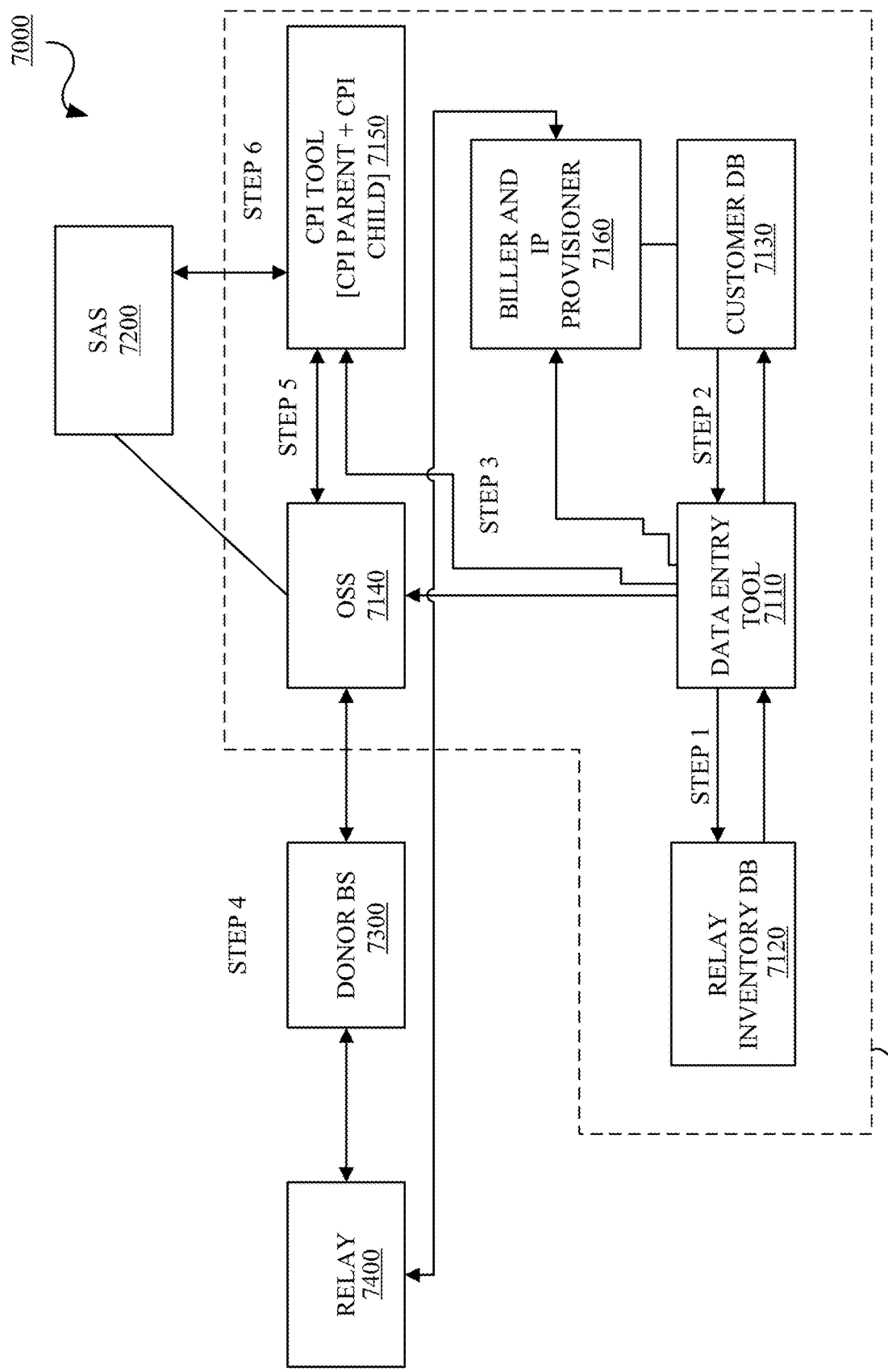
FIG. 7 is a diagram of an example of a system using automated relay registration in accordance with embodiments of this disclosure.

FIG. 7 is a diagram of an example of a system 7000 using automated relay registration in accordance with embodiments of this disclosure. The system 7000 can include, but is not limited to, a service provider system 7100 connected to or in communication with (collectively "connected to") a SAS 7200, a donor base station 7300, and a relay 7400. The service provider system 7100 can include, but is not limited to, a data entry tool 7110, a relay inventory database 7120, a customer database 7130, an operations support system (OSS) 7140, a certified professional installer (CPI) tool 7150, and a biller and IP provisioner 7160. The system 7000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The donor base station 7300 and the relay 7400 may be the base stations and relays described herein with respect to FIGS. 1-6, respectively.

The data entry tool 7110 can be a user-facing user interface via which a customer can input a request for additional coverage at a customer premises. The data entry tool 7110 may provide a series of prompts to determine what the wireless coverage issue is, where it is, and other related prompts. The data entry tool 7110 processes the input data using information from the relay inventory database 7120 and the customer database 7130 to determine how many relays are needed, what type of relays, where the relays should be placed, and other criteria as described herein. In implementations, the user can engage a customer representative who in turn can obtain the same information via a question and answer session for entry into and/or use by the data entry tool 7110 as described herein.

The relay inventory database 7120 can maintain an inventory of relays, availability, type, power, multi-sector or single sector, and other characteristics.

The customer database 7130 can maintain customer premises information including information on existing donor base station, location of customer premises, characteristics and features of the customer premises, building plans, geospatial information, and other relevant information.

The OSS 7140 works with the SAS 7200 and the other components in the service provider system 7100 to configure and provision the relays so that they can provide the wireless coverage at the customer premises as requested.

The CPI tool 7150 enables automatic registration of the relay with the SAS 7200. Consequently, installation of the relay becomes a plug-and-play operation where the customer simply places the relay as instructed and turns on the device. The rest of the configuration and registration is handled by the service provider system 7100 via the OSS 7140 and the CPI tool 7150 as described herein.

The biller and IP provisioner 7160 can handle billing and service aspects of the configuration including provisioning of an IP address for the relay, as appropriate.

Operationally, a customer or user has determined that an existing or installed base station does not provide sufficient wireless coverage in a customer premises. The customer(s) can purchase the relays online or place an order with the service provider, for example. The customer can use the data entry tool 7110 as described to enter the input data (step 1). For example, prompts at the data entry tool 7110 or questions by a customer representative can be used to determine eligibility or feasibility with respect to the use of relays. Prompts may include why additional coverage is needed, is there poor coverage on the same floor, or is there poor coverage on a different floor. The service provider system via the data entry tool 7110 can recommend the number of extenders based on the pre-determined capabilities of the relay in combination with the existing donor base station 7300. If the poor coverage is on a different floor, the data entry tool 7110 may prompt the customer to input which floor they need coverage at. The service provider system 7100 and the data entry tool 7110 can check against the relay inventory database 7120 to determine availability of the relays.

Figure 8C:
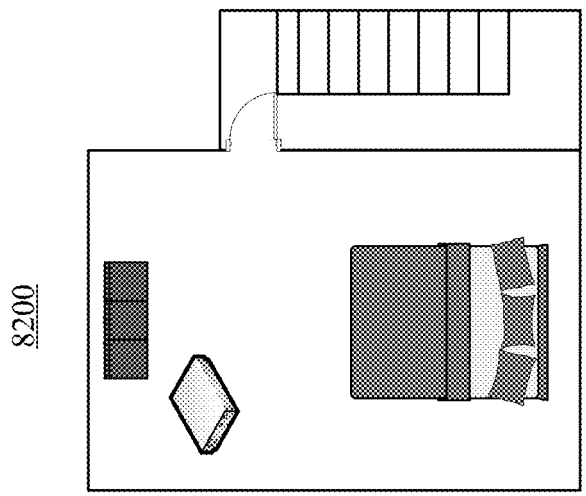
FIG. 8A-C are diagrams of an example customer premises in accordance with embodiments of this disclosure.
Figure 8B:
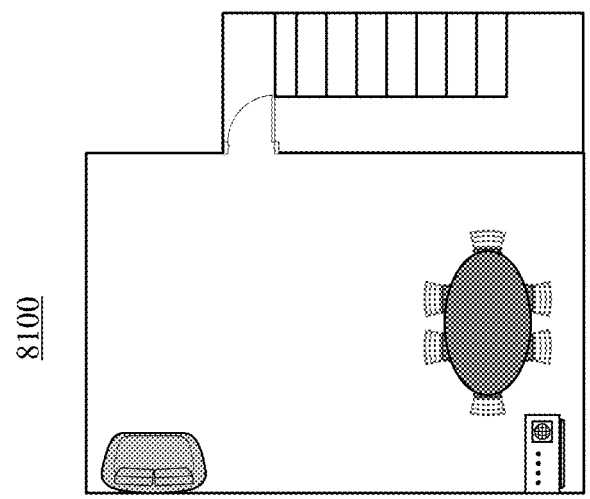
Figure 8A:
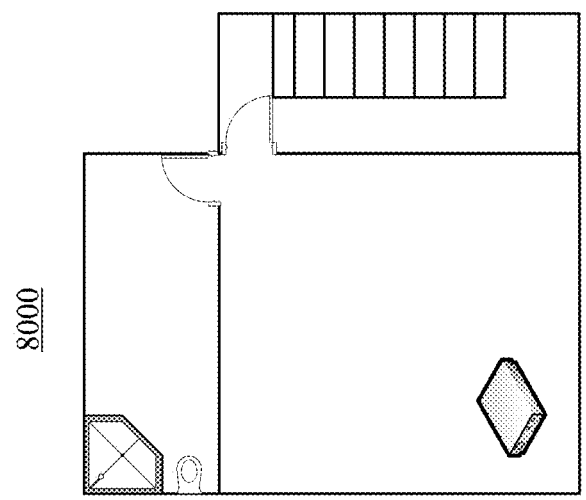

The service provider system 7100 and the customer database 7130 maintains records of the previously installed and working donor base station 7300, which is already registered with the SAS 7200 (step 2). Therefore, some of the credentials needed to register with the SAS 7200, i.e., location, height, antenna, interface, etc. are already known. Example registration information is shown in FIGS. 11A and 11B. The service provider system 7100 can determine the height from the location of the existing donor base station 7300 by using floor plans 8000, 8100, and 8200 as shown in FIGS. 8A-C. The floor plans 8000, 8100, and 8200 can be used to determine a potential height of where the relays need to be. The service provider system 7100 can estimate the height if the existing donor base station is on the second floor and the customer wants coverage on the first and third floor. That is, the service provider system 7100 can use some of the same information about height and location of the existing donor base station to determine the relative height and location for the relays for automated SAS registration of the relays. The customer database 7130 can also provide which cable modem is being used, model of the base station, and other information needed for automated provisioning and registration of the relays.

The recommended relay(s) and information from the customer database 7130 regarding the installed donor base station 7300 can be recorded in the service provider system 7100. The relay(s) can be sent to the customer premises with labels indicating, for example, which floor the relay is for.

The service provider system 7100 and the data entry tool 7110 can send the SAS registration information to the CPI tool 7150, the OSS 7140, and the biller and IP provisioner 7160 in preparation for automated SAS registration, service provisioning, and IP provisioning, respectively, when the relays are positioned and turned on at the customer premises (step 3).

The CPI tool 7150 enables automated registration with the SAS 7200. The CPI tool 7150 can create a CPI object for the relay using the already existing donor base station object and the information provided by the data entry tool 7110. This is further described with respect to FIG. 10.

The OSS 7140 is responsible for provisioning and activation of the relays. The OSS 7140 will get the configuration settings for the relays and prepare for provisioning and activation. i.e., the OSS 7140 will wait for the relay(s) 7400 to reach out to the OSS 7140 once they are turned on. That is, from a customer perspective, the relay(s) 7400 are plug and play devices which are automatically registered with the SAS 7200 once they are turned on.

The biller and IP provisioner 7160 will be informed so as to provide the IP address to the relay(s) 7400 to enable communication between the relay(s) 7400, the donor base station 7300, and the OSS 7140.

Upon receipt and activation of the relay(s) 7400, the relay(s) 7400 can establish communications with the donor base station 7300 (step 4) with IP address information received from the biller and IP provisioner 7160. In the event, that multiple hops between relay(s) are needed to provide the wireless coverage, a first relay will establish communications with the donor base station 7300, will be configured by the OSS 7140, and be automatically registered with the SAS 7200. The first relay will then act as a donor base station for the second relay and so on.

The OSS 7140 can inform the CPI tool 7150 that the relay(s) is activated (step 5). The CPI tool 7150 can send a JSON or other data interchange format object which contains the registration information shown in FIGS. 11A and 11B to the SAS 7200 (step 6). The CPI tool 7150 can notify the OSS 7140 when SAS registration is successful. The OSS 7140 can complete provisioning and bring the relay(s) on air for data or traffic communication.

Figure 9:
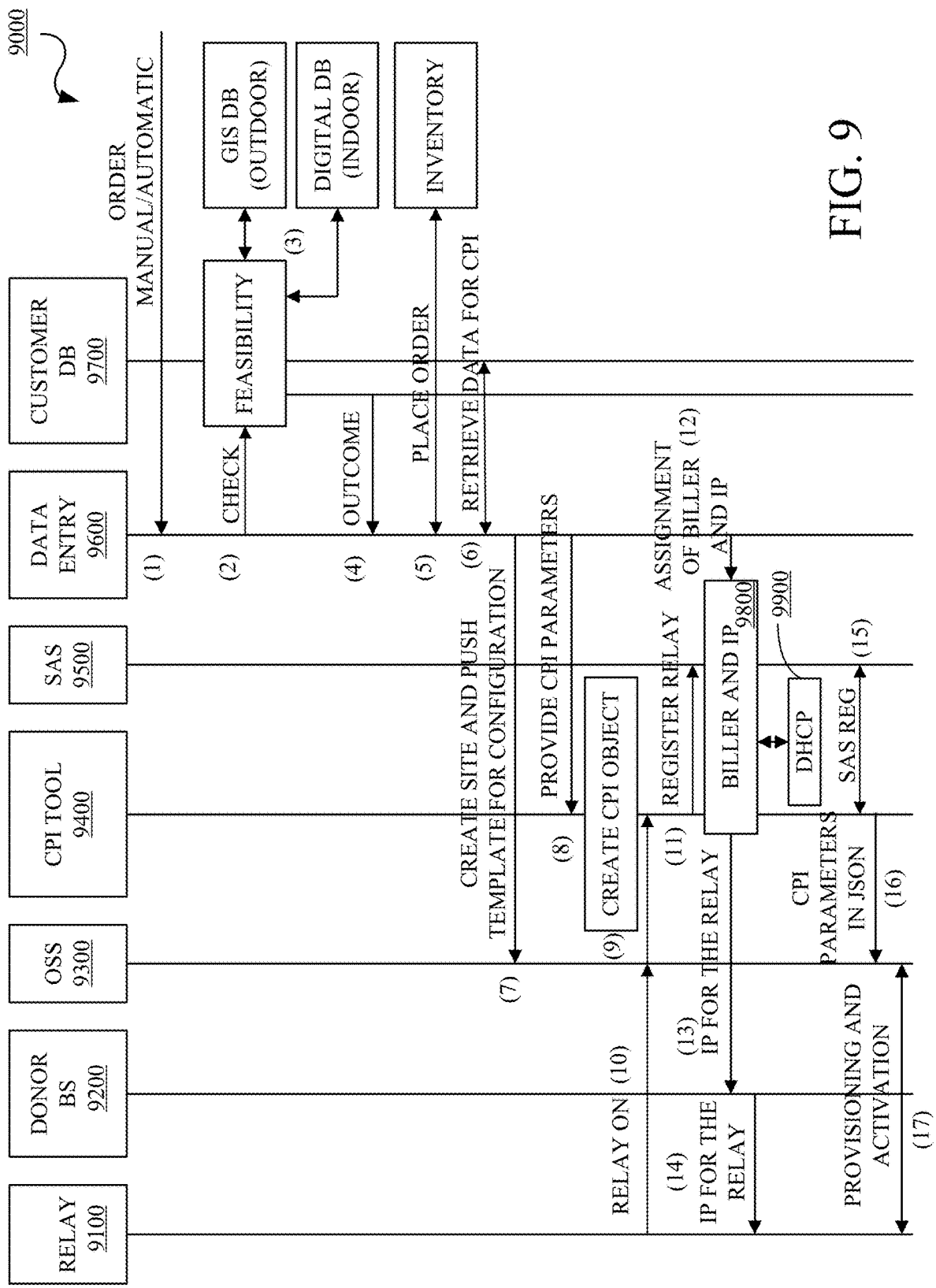
FIG. 9 is a flow diagram of an example of a system using automated relay registration in accordance with embodiments of this disclosure.

FIG. 9 is a flow diagram 9000 of an example of a system using automated relay registration in accordance with embodiments of this disclosure. The flow diagram 9000 is operable between a relay 9100, a donor base station 9200, an OSS 9300, a CPI tool 9400, a SAS 9500, a data entry tool 9600, and a customer database 9700. The components stated herein may be as described in FIGS. 1-8, 10, and 12.

The data entry tool 9600 can receive a request for an order for one or more relays in a customer premises (1). In implementations, the order can be customer initiated. In implementations, the order can be device or system initiated based on coverage measurements, coverage, customer premises topology, and/or combinations thereof. For example, the coverage may not match the customer premises topology and the relay is needed to correct the deficiency.

The data entry tool 9600 can initiate a feasibility check using a geographic information system (GIS) database when the donor base station 9200 is an outside donor base station and can use a digital database when the donor base station 9200 is an internal donor base station (2 and 3). In implementations, the digital database consists of digital GIS information. These databases consist of information such as existing outdoor sites and their coverage (propagation). This is helpful in determining if a relay would be within the coverage of a given site i.e., to determine if the relay candidate location is feasible or not. Indoor candidates could be identified using the digital GIS database which tells us if a given indoor location could be a feasible location i.e., within sufficient coverage and quality signal of the existing network. The digital database provides a digital source to identify relay opportunities. The feasibility check can determine whether a relay(s) can be used in the customer premises. This can include determining what type of relays are needed, how many are needed, placement of the relay(s), and other information based on coverage needed in the customer premises. The outcome of the feasibility check (4) can initiate a check with an inventory database to determine if relay(s) that meet the needs are available and if so, an order is placed for the relay(s) (5). The data entry tool 9600 can retrieve information about the donor base station at the customer premises from the customer database 9700 (6). The data entry tool 9600 can create a site and push a template for configuration to the OSS 9300 (7). In this instance, the site refers to both a physical site and creation of a site in the OSS 9300 i.e., so that a relay can be provisioned, brought online, and/or managed including collection of information and controlling the relay. The OSS 9300 needs various parameters (for initial configuration) to create the site such as relay serial number, MAC address, location (latitude and longitude), name of the site and various initial configuration parameters. In addition to the initial configuration, the template provides a means for pushing a list of parameters needed for the cells (relays) as per a network policy i.e., to enable various features such as mobility, quality of service, channel quality indicator (CQI), and network related policies e.g., number of users allowed, to the site. The data entry tool 9600 can provide the donor base station information (some of the CPI parameters of FIGS. 11A and 11B) to the CPI tool 9400 (8). The data entry tool 9600 can provide or notify a biller and IP address 9800 of the relay order (12). The steps 2-8 and 12 can be done automatically in response to receiving a request for a relay order. This can include checking feasibility, determining what relays are needed, determining a height of the relays from floor plans, retrieving and providing donor base station, checking relay availability, and placing an order.

The CPI tool 9400 can, responsive to the information provided by the data entry tool 9600, generate a registration object for each relay (9). In implementations, an object can be generated for each sector for each relay. Object generation is described with respect to FIG. 10, which is a flow diagram 10000 of an example of an automated CPI object generation in a system using automated relay registration in accordance with embodiments of this disclosure.

Figure 10:
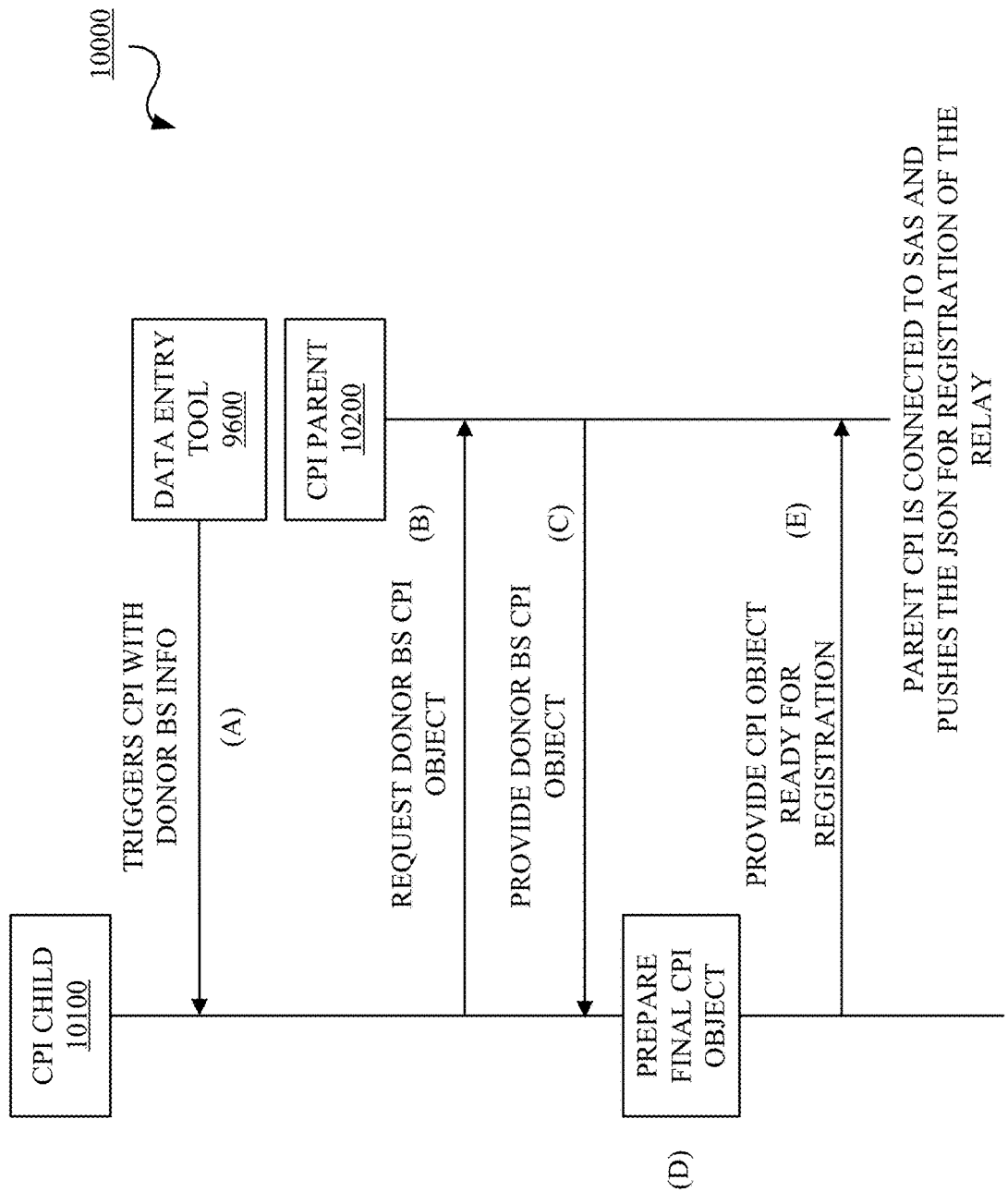
FIG. 10 is a flow diagram of an example of an automated CPI object generation in a system using automated relay registration in accordance with embodiments of this disclosure.

Referring now to both FIGS. 9 and 10, the CPI tool 9400 can include a CPI child 10100 and a CPI parent 10200. The data entry tool 9600 can provide the donor base station information to the CPI child 10100 (A). The CPI child 10100 can request the donor base station registration object information from the CPI parent 10200 (B). The CPI parent 10200 can provide the donor base station registration object to the CPI child 10100 (C). The CPI child 10100 can extract the registration information needed from the donor base station registration object to simplify the process for generating the relay registration object. The CPI child 10100 can generate the relay registration object from the extracted information and the relay information provided by the data entry tool 9600 (D). An example registration object is shown in FIG. 11A. FIG. 11B is a diagram of object fields in accordance with embodiments of this disclosure. For example, the CPI child 10100 can extract airinterface, height type, callSign, measCapability, groupingParam, etc. from the donor base station object. The CPI child 10100 can provide the relay registration object to the CPI parent 10200, which is connected to the SAS 9500 (E). The CPI parent 10200 can push the relay registration object to the SAS 9500 once the relay is turned on. The steps 9 in FIG. 9 and steps A-E in FIG. 10 can be done automatically in response to receiving a request for a relay order.

When the relay is turned on, the relay obtains an IP address from the biller and IP address 9800 via a Dynamic Host Configuration Protocol (DHCP) 9900 (13 and 14) and notifies the OSS 9300, which in notifies the CPI tool 9400 (10 and 11). The SAS 9500 can confirm registration to the CPI tool 9400 (15), which in turn can send CPI parameters to the OSS 9300 so that the OSS 9300 which site (relay) has been registered and appropriate operation parameters (16). For example, the CPI parameters can include site ID, CBSD ID, and grant and/or authorized information. The OSS 9300 can complete provisioning and activation of the relay 9100 via the donor base station 9200 (17). The steps 13-17 can be done automatically in response to turning on of the relay 9100.

Figure 12:
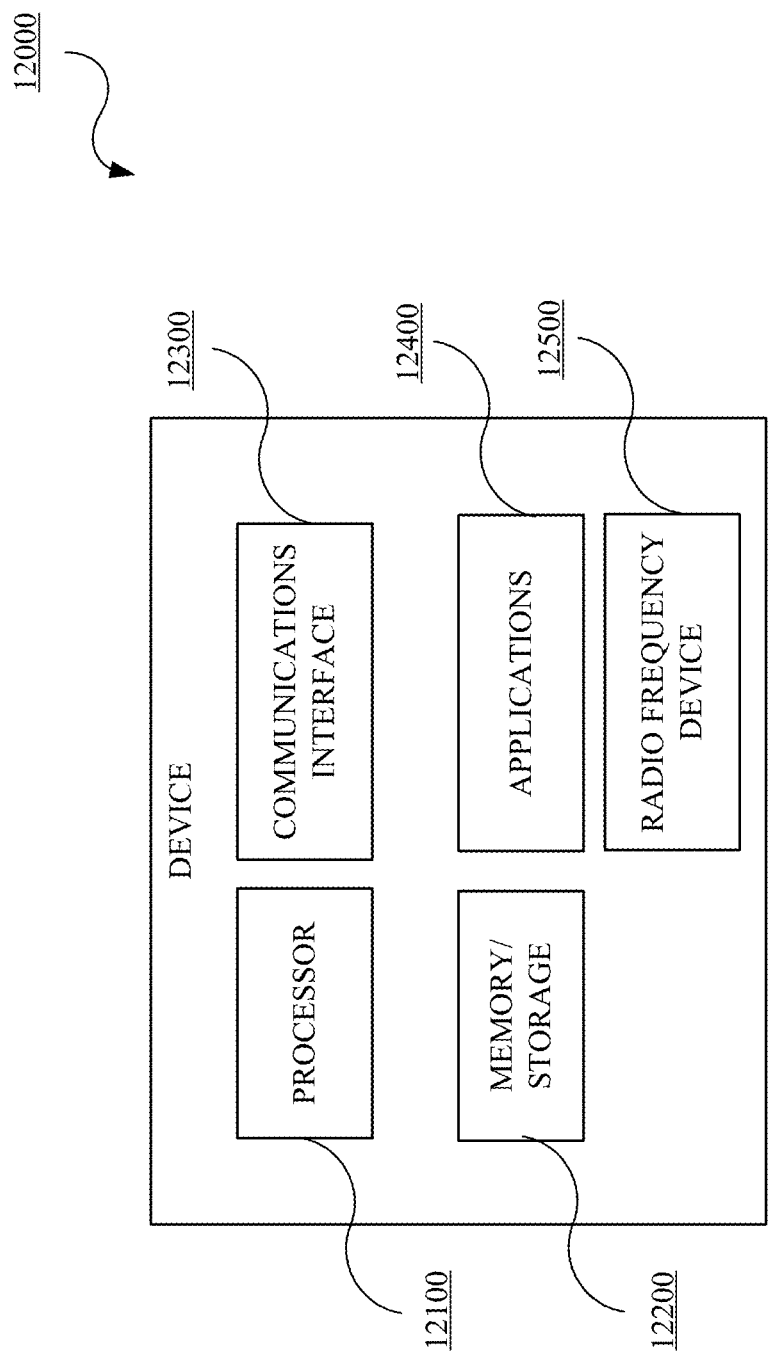
FIG. 12 is a block diagram of an example of a device in accordance with embodiments of this disclosure.

FIG. 12 is a block diagram of an example of a device 12000 in accordance with embodiments of this disclosure. The device 12000 may include, but is not limited to, a processor 12100, a memory/storage 12200, a communication interface 12300, and applications 12400. In an implementation, the device 12000 can include a radio frequency device 12500. The device 12000 may include or implement, for example, the components described with respect to FIGS. 1-10. The applicable or appropriate flows, techniques, or methods described herein may be stored in the memory/storage 12200 and executed by the processor 12100 in cooperation with the memory/storage 12200, the communications interface 12300, the applications 12400, and the radio frequency device 12500 (when applicable), as appropriate. The device 12000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 13:
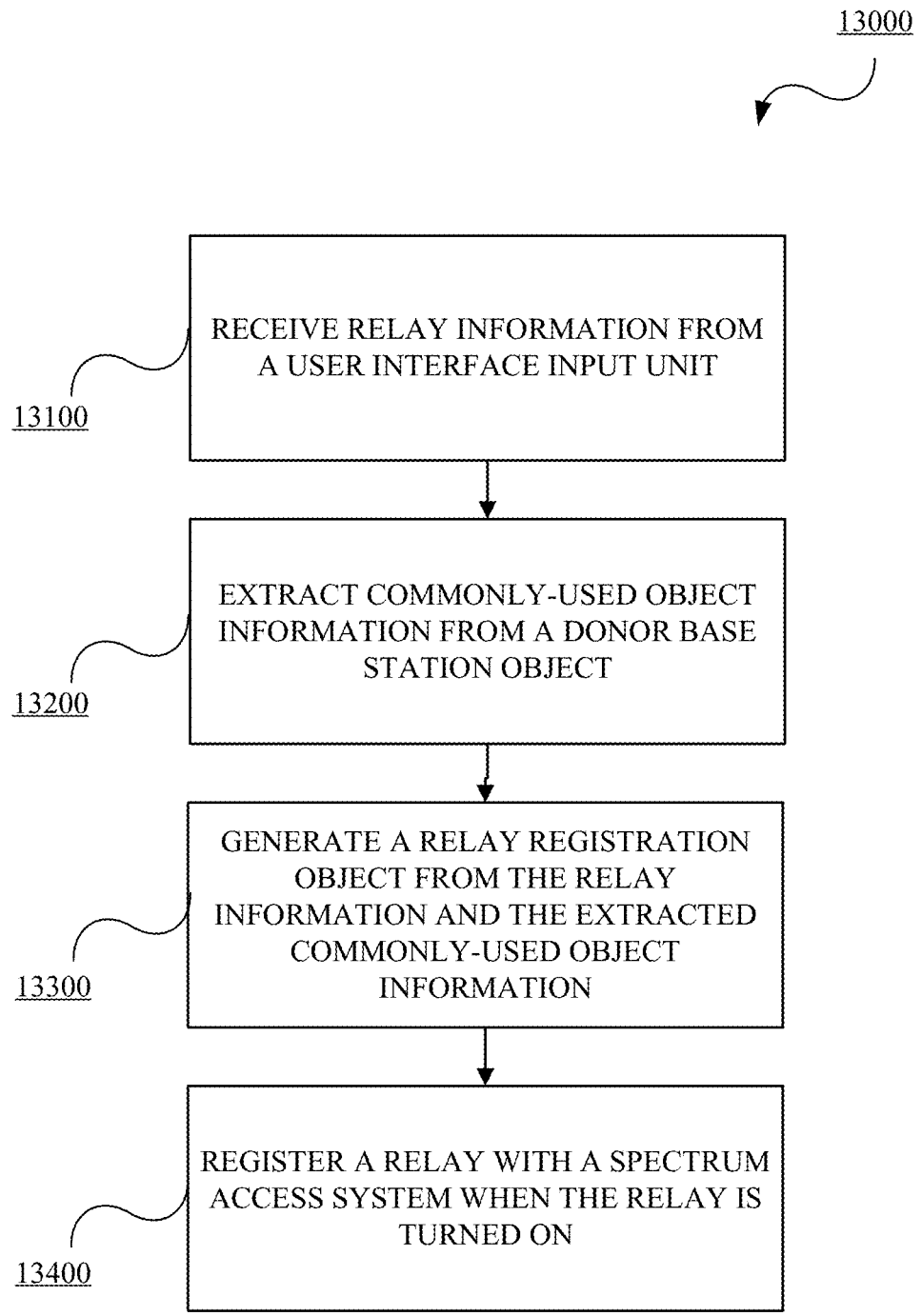
FIG. 13 is a flowchart of an example method for automated registering of a relay in accordance with embodiments of this disclosure.

FIG. 13 is a flowchart of an example method 13000 for automated registering of a relay in accordance with embodiments of this disclosure. The method 13000 includes receiving 13100 relay information from a user interface input unit, extracting 13200 commonly-used object information from a donor base station object; generating 13300 a relay registration object from the relay information and the extracted commonly-used object information; and registering 13400 a relay with a spectrum access system when the relay is turned on. The method 13000 can be implemented, for example, in or by components described with respect to FIGS. 1-10, the device 12000, the processor 12100, the memory/storage 12200, the communications interface 12300, the applications 12400, and the radio frequency device 12500 when available, as appropriate and applicable. The donor base station and the relays at least operate in a CBRS system and spectrum where relays need to be registered with a SAS before provisioning and activation for data and/or traffic communications.

The method includes receiving 13100 relay information from a user interface input unit. A customer or system component can initiate a request for a relay to extend or complement wireless coverage provided by a donor base station at a customer premises. The relay request automatically initiates a feasibility check and an inventory check. During and/or after the feasibility check, information regarding the type of relays needed, placement of the relays in the customer premises, height information for the relays, what donor base station is present, and other information is determined (collectively "relay information"). A relay order is automatically placed if the feasibility check passes and relays are available from the inventory check. The relay information is automatically distributed to service provider components as described herein to initiate further processing such as configuration processing, billing processing, IP address processing, provisioning processing, SAS registration processing, and the like (collectively "relay processing").

The method includes extracting 13200 commonly-used object information from a donor base station object. An automated SAS registration processing tool and/or CPI tool can retrieve, based on the donor base station information in the relay information, a donor base station registration object. The automated SAS registration processing tool can extract registration object fields from the donor base station registration object that will be the same for a relay registration object (referred to as "commonly-used object information"). The commonly-used object information can include, for example, airinterface, height type, callSign, measCapability, and groupingParam. The airinterface indicating an air interface type used by the relay and a measCapability indicting a measuring capability of the relay.

The method includes generating 13300 a relay registration object from the relay information and the extracted commonly-used object information. The automated SAS registration processing tool can generate the relay registration object from the commonly-used object information and the relay information provided by the user interface input unit. In this instance, the pertinent relay information includes at least the height of the relay in the customer premises, the location using latitude and longitude, and other specific site or relay information.

The method includes registering 13400 a relay with a spectrum access system when the relay is turned on. Post-relay processing is automatically initiated when the relay is turned on at the customer premises. The post-relay processing can include sending an IP address to the relay and the automated SAS registration processing tool automatically sending the relay registration object to the SAS for relay registration. The OSS can automatically complete provisioning and activating the relay upon receipt of a successful SAS registration notification from the SAS. Consequently, the customer at the customer premises has to perform no SAS registration processing. Moreover, a service provider does not have to send any personnel to install, activate, and/or perform SAS registration at the customer premises.

Disclosed herein are methods for automated relay registration in a customer premises. In implementations, a method for automatically registering a relay using a Citizens Broadband Radio Service (CBRS) spectrum includes receiving, at a spectrum access system (SAS) registration processing tool from a user interface input unit, relay information for a relay to extend wireless coverage in a customer premises, the wireless coverage extending from a donor base station, extracting, by the SAS registration processing tool, commonly-used object information from a donor base station object associated with the donor base station, generating, by the SAS registration processing tool, a relay registration object from the relay information and the extracted commonly-used object information, and automatically registering, by the SAS registration processing tool, the relay with a spectrum access system using the relay registration object when the relay is turned on at the customer premises.

In implementations, the receiving, the extracting, and the generating are automatically executed in response to receiving a request to extend the wireless coverage at the customer premises. In implementations, the receiving, the extracting, and the generating are automatically executed in response to receiving a request to extend the wireless coverage at the customer premises. In implementations, the relay information includes at least a height for the relay in the customer premises and a location of the donor base station. In implementations, the commonly-used object information includes at least air interface information and type and measuring capability of the relay. In implementations, the donor base station is at least one of an outdoor donor base station or an indoor donor base station. In implementations, the relay is a multisector relay and the receiving, the extracting, the generating, and the automatically registering is repeated for each sector of the multisector relay. In implementations, the relay is multiple relays, and the receiving, the of the extracting, the generating, and the automatically registering is repeated for each relay. In implementations, the method further includes checking, by a service provider system, a feasibility of installing the relay at the customer premises. In implementations, the method further includes determining, by the service provider system, a height of the relay at the customer premises, wherein the height is included in the relay information. In implementations, the relay is multiple relays, and the receiving, the of the extracting, the generating, and the automatically registering is repeated for each relay.

Disclosed herein are systems for automated relay registration in a customer premises. In implementations, a service provider system includes a data input interface configured to receive a request for a relay to extend Citizens Broadband Radio Service (CBRS) spectrum-based wireless coverage at a customer premises; and a spectrum access system (SAS) registration tool. The SAS registration tool configured to retrieve commonly-used object information from a donor base station object associated with a donor base station from which the relay extends the wireless coverage; create a relay registration object from the relay information and the commonly-used object information; and automatically register the relay with a spectrum access system using the relay registration object when the relay is turned on at the customer premises.

In implementations, the relay information includes at least a height for the relay in the customer premises and a location of the donor base station. In implementations, the commonly-used object information includes at least air interface information and type and measuring capability of the relay. In implementations, the donor base station is at least one of an outdoor donor base station or an indoor donor base station. In implementations, the relay is a multisector relay and each sector of the multisector relay is individually processed. In implementations, the relay is multiple relays, and each relay is individually processed. In implementations, the service provider system is further configured to perform a feasibility check for provisioning the relay at the customer premises. In implementations, the service provider system is configured to determine a height of the relay at the customer premises, wherein the height is included in the relay information.

Disclosed herein are methods for automated relay registration in a customer premises. In implementations, a method for automatically registering a Citizens Broadband Radio Service (CBRS) spectrum-based relay includes receiving, at a user interface, a request to extend wireless coverage at a customer premises; determining, by a service provider system, one or more relays to extend the wireless coverage based on a donor base station; receiving, at a registration tool from the user interface and the service provider system, relay information for the one or more relays; extracting, by the registration tool, commonly-used object information from a donor base station object associated with the donor base station; generating, by the registration tool, a relay registration object from the relay information and the extracted commonly-used object information; and automatically registering, by the registration tool, the relay with a spectrum access system using the relay registration object when the one or more relays is turned on at the customer premises.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for automatically registering a relay using a Citizens Broadband Radio Service (CBRS) spectrum, the method comprising:
   receiving, at a spectrum access system (SAS) registration processing tool from a user interface input unit, relay information for a relay to extend wireless coverage in a customer premises, the wireless coverage extending from a donor base station;
   extracting, by the SAS registration processing tool, commonly-used object information from a donor base station object associated with the donor base station;
   generating, by the SAS registration processing tool, a relay registration object from the relay information and the extracted commonly-used object information; and
   automatically registering, by the SAS registration processing tool, the relay with a spectrum access system using the relay registration object when the relay is turned on at the customer premises.

2. The method of claim 1, wherein the receiving, the extracting, and the generating are automatically executed in response to receiving a request to extend the wireless coverage at the customer premises.

3. The method of claim 1, the method further comprising:
   determining, by the SAS registration processing tool, whether the relay is within a coverage area of the donor base station.

4. The method of claim 1, wherein the relay information includes at least a height for the relay in the customer premises and a location of the donor base station.

5. The method of claim 4, wherein the commonly-used object information includes at least air interface information and type and measuring capability of the relay.

6. The method of claim 1, wherein the donor base station is at least one of an outdoor donor base station or an indoor donor base station.

7. The method of claim 1, wherein the relay is a multi-sector relay and the receiving, the extracting, the generating, and the automatically registering is repeated for each sector of the multisector relay.

8. The method of claim 1, wherein the relay is multiple relays, and the receiving, the of the extracting, the generating, and the automatically registering is repeated for each relay.

9. The method of claim 1, the method further comprising:
   checking, by a service provider system, a feasibility of installing the relay at the customer premises.

10. The method of claim 9, the method further comprising:
    determining, by the service provider system, a height of the relay at the customer premises, wherein the height is included in the relay information.

11. The method of claim 1, wherein the relay is multiple relays, and the receiving, the of the extracting, the generating, and the automatically registering is repeated for each relay.

12. A service provider system, comprising:
a data input interface configured to receive a request for a relay to extend Citizens Broadband Radio Service (CBRS) spectrum-based wireless coverage at a customer premises; and
a spectrum access system (SAS) registration tool configured to:
retrieve commonly-used object information from a donor base station object associated with a donor base station from which the relay extends the wireless coverage;
create a relay registration object from the relay information and the commonly-used object information; and
automatically register the relay with a spectrum access system using the relay registration object when the relay is turned on at the customer premises.

13. The service provider system of claim 12, wherein the relay information includes at least a height for the relay in the customer premises and a location of the donor base station.

14. The service provider system of claim 13, wherein the commonly-used object information includes at least air interface information and type and measuring capability of the relay.

15. The service provider system of claim 12, wherein the donor base station is at least one of an outdoor donor base station or an indoor donor base station.

16. The service provider system of claim 12, wherein the relay is a multisector relay and each sector of the multisector relay is individually processed.

17. The service provider system of claim 12, wherein the relay is multiple relays, and each relay is individually processed.

18. The service provider system of claim 12, wherein the service provider system is further configured to perform a feasibility check for provisioning the relay at the customer premises.

19. The service provider system of claim 12, wherein the service provider system is configured to determine a height of the relay at the customer premises, wherein the height is included in the relay information.

20. A method for automatically registering a Citizens Broadband Radio Service (CBRS) spectrum-based relay, the method comprising:
receiving, at a user interface, a request to extend wireless coverage at a customer premises;
determining, by a service provider system, one or more relays to extend the wireless coverage based on a donor base station;
receiving, at a registration tool from the user interface and the service provider system, relay information for the one or more relays;
extracting, by the registration tool, commonly-used object information from a donor base station object associated with the donor base station;
generating, by the registration tool, a relay registration object from the relay information and the extracted commonly-used object information; and
automatically registering, by the registration tool, the relay with a spectrum access system using the relay registration object when the one or more relays is turned on at the customer premises.

* * * * *